(12) United States Patent
Garcia et al.

(10) Patent No.: US 7,234,850 B2
(45) Date of Patent: Jun. 26, 2007

(54) METHOD OF PRODUCING ROOF PANELLING WITH AN INTEGRATED LIGHTING SYSTEM AND THE PANELLING THUS OBTAINED

(75) Inventors: Angel Solanas Garcia, Burgos (ES); Darío Soto Romero, Burgos (ES); Carolina Olivan Ahedo, Burgos (ES)

(73) Assignee: Grupo Antolin-Ingenieria, S.A. (ES)

( * ) Notice: Subject to any disclaimer, the term of this patent is extended or adjusted under 35 U.S.C. 154(b) by 81 days.

(21) Appl. No.: 10/484,938

(22) PCT Filed: Jul. 24, 2001

(86) PCT No.: PCT/ES01/00294

§ 371 (c)(1),
(2), (4) Date: Dec. 7, 2004

(87) PCT Pub. No.: WO03/010032

PCT Pub. Date: Feb. 6, 2003

(65) Prior Publication Data

US 2005/0122732 A1    Jun. 9, 2005

(51) Int. Cl.
*F21W 101/08* (2006.01)
(52) U.S. Cl. .................. 362/490; 362/84; 296/214
(58) Field of Classification Search ............... 362/490, 362/488, 493, 543, 544, 84; 296/214
See application file for complete search history.

(56) References Cited

U.S. PATENT DOCUMENTS

| 5,309,634 A | 5/1994 | Van Order et al. |
| 5,434,013 A | 7/1995 | Fernandez |
| 6,273,499 B1 | 8/2001 | Guyon |
| 6,464,381 B2 * | 10/2002 | Anderson et al. ........... 362/488 |
| 6,517,226 B1 | 2/2003 | Zimmermann et al. |
| 2003/0026105 A1 * | 2/2003 | Becher et al. .............. 362/490 |

FOREIGN PATENT DOCUMENTS

| EP | 0979760 B1 | 2/2000 |
| EP | 1038731 A1 | 9/2000 |
| FR | WO 01/49525 A1 | 7/2001 |
| WO | WO 99/43517 | 9/1999 |

* cited by examiner

*Primary Examiner*—Laura Tso
(74) *Attorney, Agent, or Firm*—Schiff Hardin LLP

(57) ABSTRACT

The procedure consists in incorporating in the actual process of conforming a roof lining, determined by the securing to each other of a previously conformed lining support and the positioning and securing thereon of a coating, of one or more electroluminescent strips which will constitute a lighting system of the roof lining, which electroluminescent strips are integrated between such lining support and coating, each of them with a ribbon cable and a connector which are made to pass through a hole of the support of the lining and is finished in a connector, which is hidden by the rear face of the actual lining for its connection to the power supply of the roof of the vehicle in which the lining is applied.

3 Claims, 5 Drawing Sheets

METHOD OF PRODUCING ROOF PANELLING WITH AN INTEGRATED LIGHTING SYSTEM AND THE PANELLING THUS OBTAINED

BACKGROUND OF THE INVENTION

The present invention relates to a procedure for obtaining a roof lining/paneling with integrated lighting system, the fundamental characteristic of which is that in the actual process of forming the lining, applicable with its coating on the roof of vehicles, it incorporates a lighting system based on electroluminescent light strips, defining a single assembly for its definitive installation on the roof of a vehicle without the necessity of having to mount the lighting system independently, since it is integrated in the lining itself.

The roof lining for vehicles is likewise an object of the invention, this lining being obtained by way of the procedure of the invention, which lining incorporates a lighting system constituted by one or several electroluminescent strips, each one of them with its corresponding ribbon cable and connector for the supply of electric power to this strip or these strips and a connector for the connection to the general roof wiring system.

At the present time, some roof linings are known which incorporate different accessories such as loudspeakers, head airbags, etc., their purpose being to increase the added value of the roof lining, incorporating therein different accessories which typically constitute elements independent of the lining.

Regarding the accessories which constitute the interior lighting systems of a motor vehicle, these accessories are presently constituted by assemblies of pieces independent of the roof lining, and they are mounted thereon in a different and subsequent phase to that of forming the lining.

Traditionally, the mounting of these lighting systems was carried out in a stage different to that of mounting the roof lining, although at the present time alternatives exist in which modular roofs are marketed wherein the mounting of some components, like those, for example, associated with the lighting system of the interior of the vehicle, is carried out on the roof lining on the lining supplier's premises, whereby the modular assembly is subsequently mounted on the vehicle in a single step.

In any case, the assembly of pieces which form the interior lighting systems of vehicles corresponds to: a source of light emission; a diffuser element of the light emitted by the source; a supporting element for the assembly; and a system of cables which feeds the light source with the necessary electric power.

These systems present a series of drawbacks, including:

The traditional sources of light emit heat to the consequent detriment of user comfort, as well as of the life of other components in the vehicle which can be mounted near to them.

The traditional light sources produce very localized lighting creating areas of shadow inside the compartment, that is, they cannot be used as ambient lighting which produces a general or more diffuse illumination of the compartment without it being very harsh. Nor is it possible to resolve this problem of lighting by increasing the number of points of light, due to the aforementioned problem of heat emission.

The light intensity cannot be varied as a function of the quantity of external light or of the requirements at any given moment.

The traditional lighting systems are, on occasion, a nuisance for the drivers of other vehicles.

The traditional lighting systems, or at least the light diffusers, remain visible at times when their operation is not required, which affects the development of the complete vehicle and the aesthetic function of the interior thereof.

The traditional systems require space for their location and assembly, affecting the habitability of the interior of the vehicle.

SUMMARY OF THE INVENTION

The present invention simultaneously resolves the functions required of a roof lining and those required of a lighting system for the interior of the vehicle that traditionally utilized components in lighting systems such as the light diffuser element, support elements for the light source, etc.

The procedure of an embodiment of the invention is based on conforming the roof lining of a vehicle in such a way that in the same conformation procedure the corresponding lighting system is incorporated and integrated, the latter being determined by one or several electroluminescent strips, with the addition of a ribbon cable for the power supply to the strip or strips and a connector for connection to the general system of roof wiring.

The procedure is based on the following operative phases:

Positioning of the different layers which will form the support of the roof lining on a press.

Conformation, by way of the press, of the support and the implementation of a hole for the passage of the corresponding power supply ribbon cable. In this same phase, in correspondence with the corners of the support, a like number of holes are created that serve for the centering and subsequent positioning of the support.

Extraction of the lining support obtained in the above press and positioning thereof on a supporting cradle.

Positioning and mounting of the electroluminescent strips on the support of the lining located in the supporting cradle. The securing of those electroluminescent strips on the surface of the lining support is carried out by application of adhesive, which could be by applying a two-sided adhesive tape previously fixed to the electroluminescent strip, or by applying adhesive beforehand on the corresponding surface of the lining support in order to attach the strip on the adhesive.

This operation can be completely manual or the system of positioning the electroluminescent strips can be automated. In the first case, a reference is necessary on the lining itself, like, for example, an insert which is implemented in the previous conforming process. In the second case, the actual supporting cradle will serve as reference for the automatic positioning system.

The operation may include the positioning of the power supply ribbon cable, passing the corresponding connector and a part or end of the ribbon cable through the hole practiced for this purpose in the lining support, with the end length of the ribbon cable and of the connector being arranged on the unseen face of the lining to allow their subsequent connection to the wiring system of the roof. The aforementioned operation of positioning or assembly of the flat connector and of the ribbon cable can be carried out by hand or automatically.

For extraction of the roof lining with the electroluminescent strips fixed thereto, with respect to the supporting cradle, the following steps may be performed:

Positioning of the lining support with the electroluminescent strips on a coating press.

Location of the coating on the support or lining located on the press and performing the corresponding pressing action.

Finally, cutting is carried out, both of the superfluous material of the perimeter, and of those holes necessary for housing other functions, obtaining in this way a roof lining which has the corresponding lighting system based on electroluminescent strips integrated therein, all capable of being mounted correctly on the roof of a vehicle and establishing the corresponding connection of the connector to the power source of the vehicle roof.

The lining obtained based on the aforementioned procedure is also contemplated by the invention, which lining is constituted, as is traditional, by way of a support and the corresponding coating thereof, with the configuration appropriate to the vehicle in which it is to be applied, but with the innovation of having integrated in an inseparable way the electroluminescent strip or strips which will constitute the lighting system of the roof lining.

The lining obtained offers a series of advantages with respect to those conventionally available, which can be summarized in the following:

1. The reduction of the manufacturing costs by performing the mounting of the lighting system in the same process of conforming the roof lining, with the consequent saving through elimination of the mounting and subsequent installation of the lighting system.

2. The elimination of such components as the light diffuser or the support for the source of light emission required in the traditional lighting systems.

3. The source of light emission does not produce heat, resulting in greater user comfort and therefore allowing a larger number of light sources distributed all over the roof.

4. The possibility of producing a uniform light inside the compartment, minimizing the number of dark areas.

5. The aesthetic aspect is enhanced both of the roof of the vehicle and of the compartment in general thereof, insofar as no element is visible when the lighting system is off.

DESCRIPTION OF THE DRAWINGS

To complete the description being made to provide a better understanding of the characteristics of the invention, in accordance with a preferred example of practical embodiment thereof, accompanying, as an integral part of the description, is a set of drawings wherein, by way of illustration and not restrictively, the following has been represented.

DETAILED DESCRIPTION OF THE PREFERRED EMBODIMENTS

Figure 1:
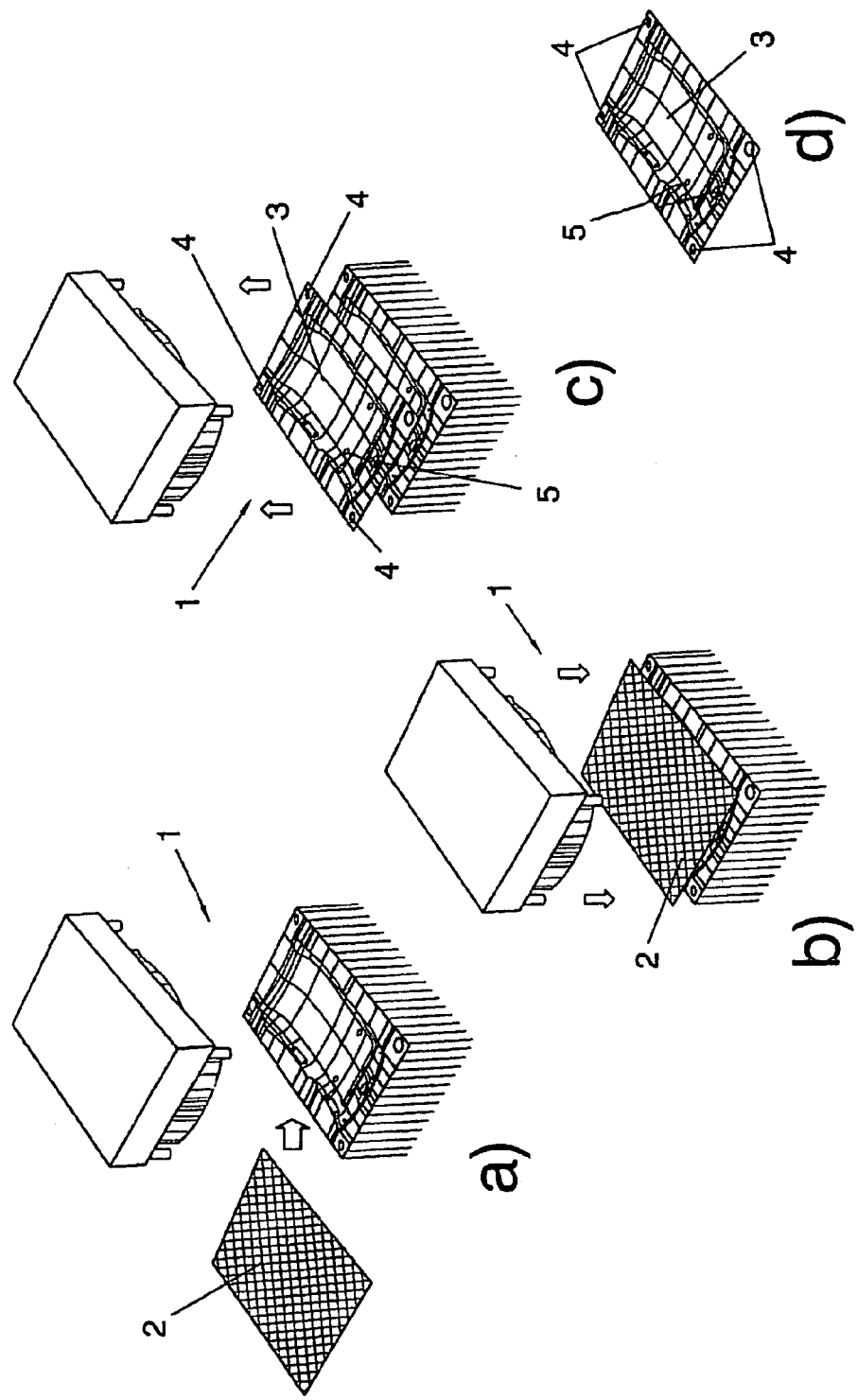
FIG. 1 is an isometric pictorial illustration showing a representation corresponding to the first four phases of the procedure for obtaining a roof lining for vehicles with integrated lighting system.
Figure 2:
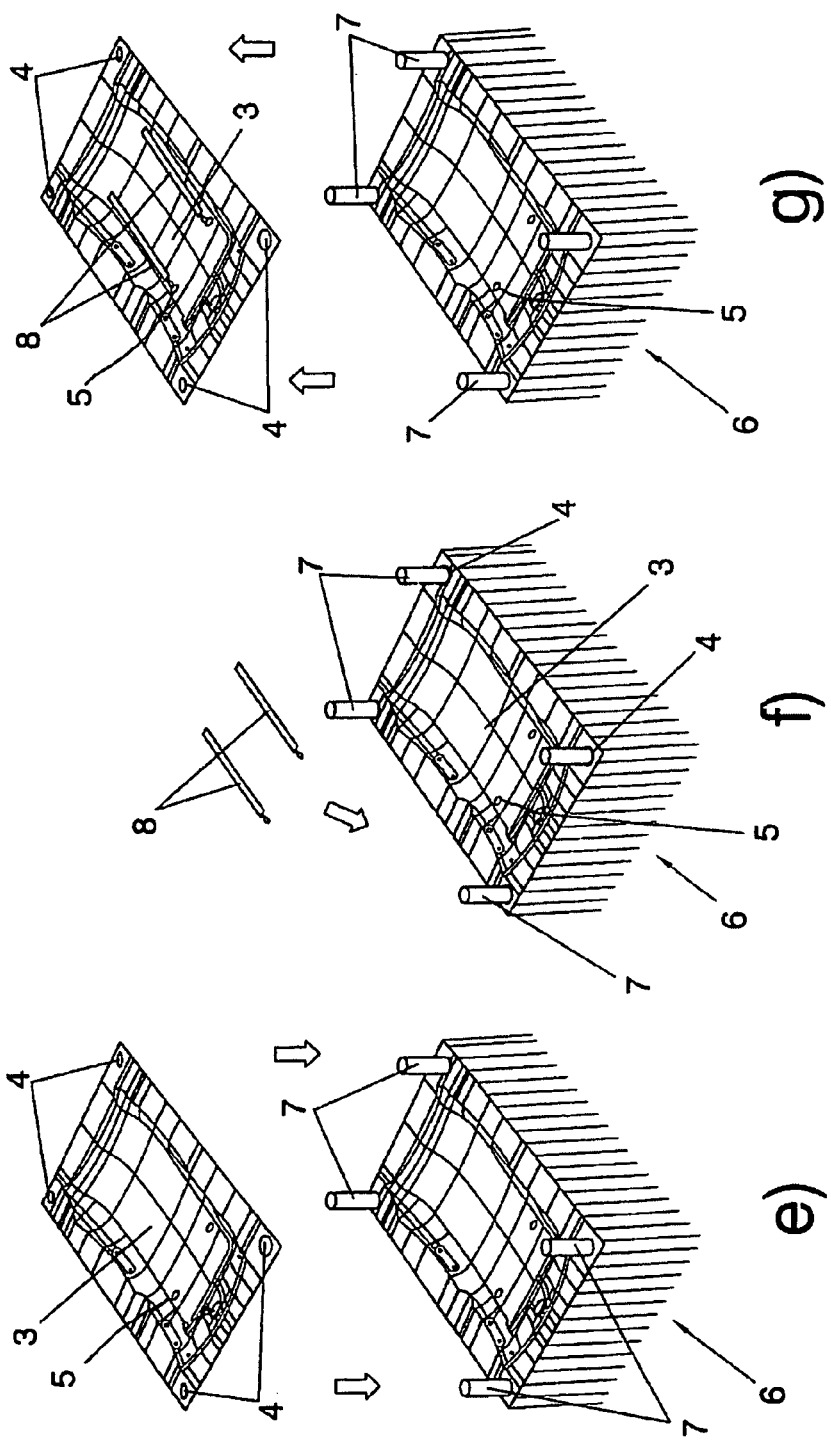
FIG. 2 is an isometric pictorial illustration showing three following phases of the actual process of obtaining the roof lining.
Figure 3:
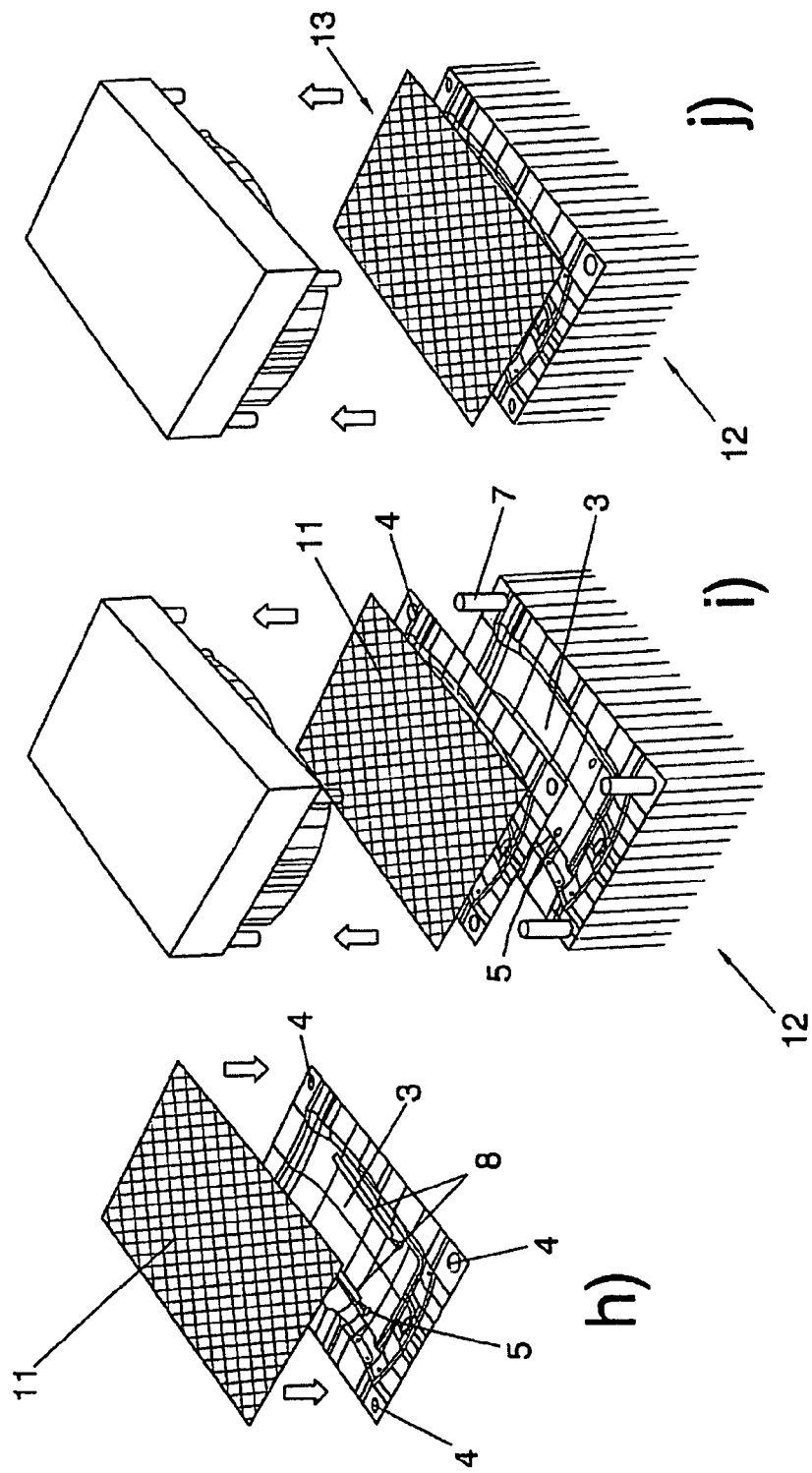
FIG. 3 is an isometric pictorial illustration showing the final phases of an embodiment of the procedure for obtaining the roof lining.

FIGS. 1 to 3 illustrate the procedure of obtaining roof linings with an integrated lighting system, all in accordance with an embodiment of the invention.

In a first phase (a), the different layers 2 are arranged on a press 1 which will eventually form the lining support 3. In a following phase (b), the layers 2 are pressed to produce the lining support 3, as is shown in phase (c); the lining support 3 is then extracted from the press 1 (phases (c) & (d)).

Phase (b), in addition to forming the lining support 3, may produce corner holes 4, should they be necessary, in each of the corners of the lining support 3, as well as one or several wiring holes 5 for passing the respective connector and power supply cable. In the event that the subsequent positioning of the electroluminescent strips is done by hand, the support will be provided with inserts or marks which allow the operative to have a proper reference. In the event that the positioning of the strips is automatic, the corner holes 4 are utilized in a later phase to position the lining support 3. Those corner holes 4, although located in correspondence with the corners, belong to a perimeter strip which is ultimately removed from the lining support 3 in the final cutting operation once the coating of the same has been carried out.

In an ensuing phase (e), the lining support 3 with the corner holes 4 and wiring holes 5 is located on a supporting cradle 6 which, when the strips 8 will be automatically positioned, will come with some nipples 7 serving as guides for the lining support 3 by making the guide nipples 7 coincide with the corner holes 4 of the support 3. When the lining support 3 is positioned on the supporting cradle 6, as is represented in the detail corresponding to phase (f) of FIG. 2, the location and assembly of the electroluminescent strip or strips 8 is carried out on the support 3, automatically or by hand, employing, in this latter case, the reference inserts made on the lining support, these strips being fixed using an adhesive of any kind.

Figure 7:
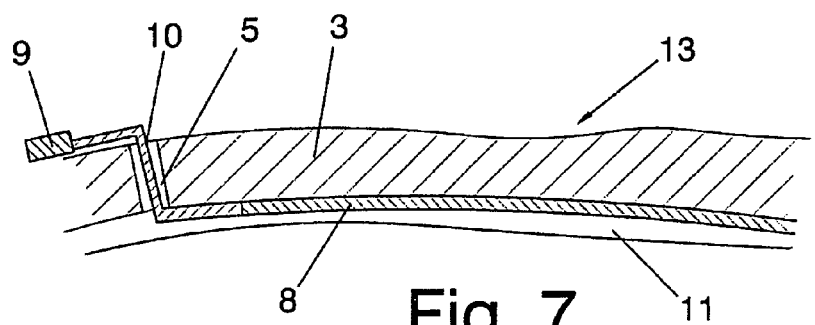
FIG. 7 is a side view cross-section showing another detail of the positioning and assembly of an electroluminescent strip integrated in the roof lining obtained in accordance with the procedure of the present invention, this detail corresponding to the section represented by B-B of FIG. 4.

At this time, the flat connector 9 (FIG. 7) may be made to pass through each of the wiring holes 5 of the support 3 so that each of the parts of the ribbon cable 10 to which the flat connector 9 is joined, is located together with the latter on the unseen face of the lining support 3 to allow the subsequent connection thereof to the wiring system of the roof.

In the following phases shown in (h) and (i) in FIG. 3, the coating 11 is placed on the lining support 3, and all this on a new press 12. In that position, corresponding to phase (i) of FIG. 3, the pressing and corresponding securing is performed, after applying an adhesive to the coating 11 on the lining support 3. This creates the actual roof lining 13, that is that formed by the support 3 and the lining 11. This roof lining 13 is extracted from that press 12 as is represented in phase (j) of FIG. 3, the roof lining 13 incorporating the lighting system based on the electroluminescent strip or strips 8 with the cable 10 (FIG. 7) connected to them and the connector 9 for the connection to the corresponding roof power supply, whereby the assembly can be applied correctly to the roof of a vehicle without the requirement of having to carry out subsequent assemblies as occurs conventionally in the traditional lighting systems for vehicle roofs.

Figure 4:
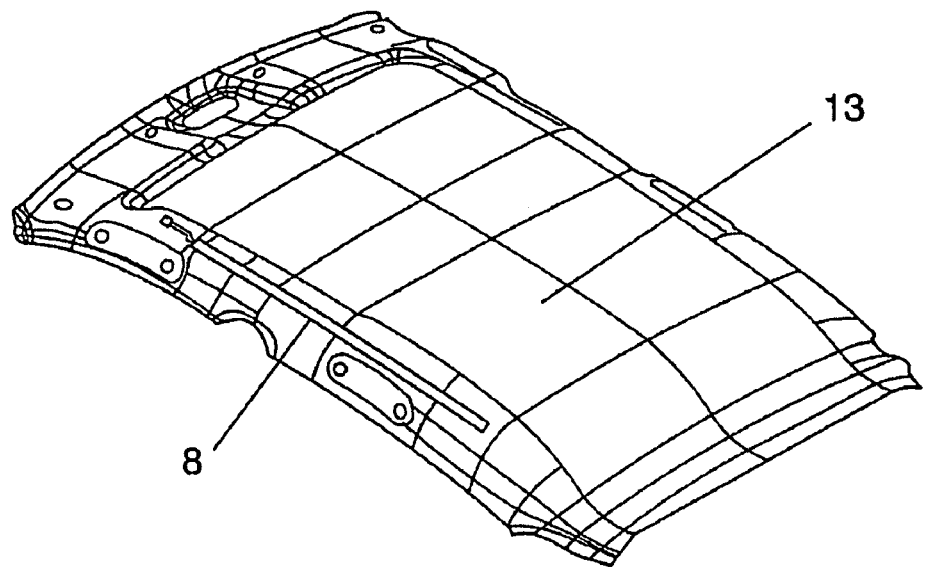
FIG. 4 is an isometric pictorial illustration showing a representation according to a general perspective of a roof lining according to an embodiment of the invention, and wherein an electroluminescent strip is provided as a lighting system integrated in the lining itself.
Figure 5:
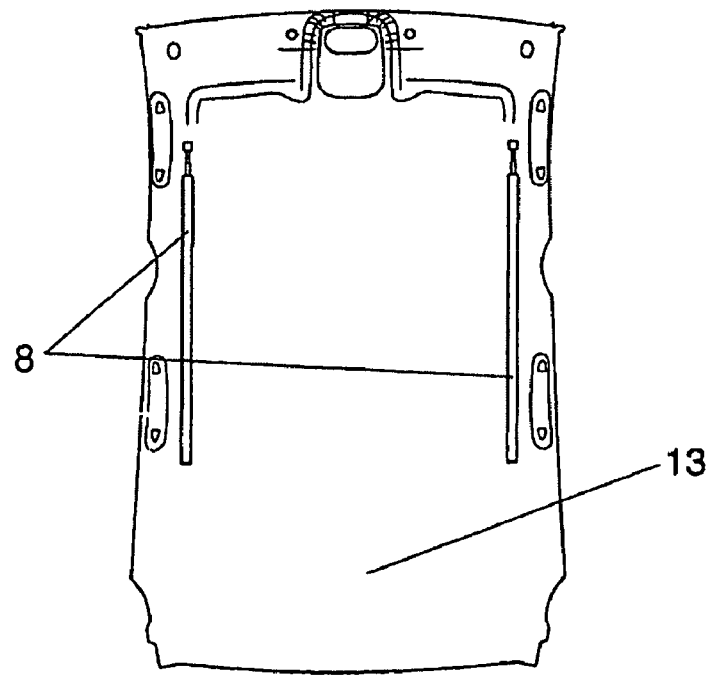
FIG. 5 is a plan view of the roof lining itself with the integrated lighting system formed by two electroluminescent strips arranged longitudinally, having eliminated from this lining the perimeter strips in which are provided the corner holes for positioning of the support in the corresponding presses that act in certain phases of the procedure.
Figure 6:
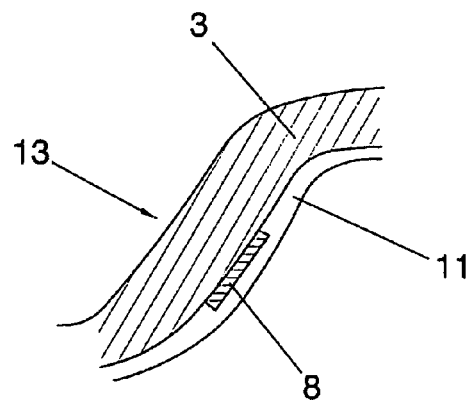
FIG. 6 is a side view cross-section showing detail corresponding to the position of an electroluminescent strip integrated in the lining, the detail corresponding to the section A-A of FIG. 4.
Figure 8:
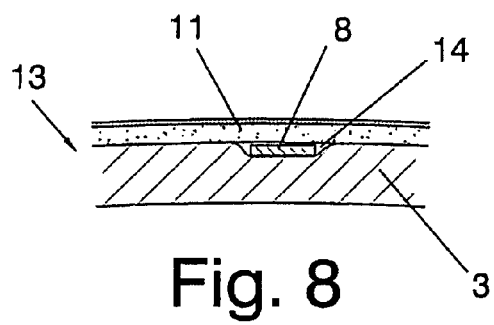
FIG. 8 is a side view showing details in cross section of the electroluminescent strip being mounted in a location on an inset of the lining support.
Figure 9:
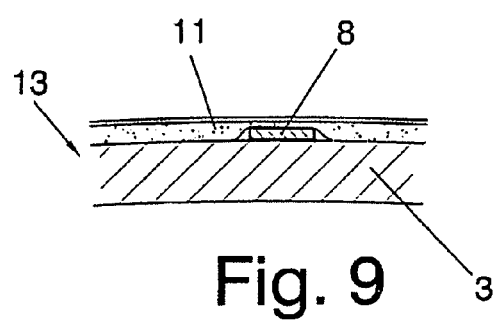
FIG. 9 is a side view showing details in cross section of the electroluminescent strip being mounted in a location on the lining support itself, but without insert, superimposed instead on its surface.

FIG. 4 shows the completed roof lining in which an electroluminescent strip is provided as a lighting system integrated in the lining itself, and FIG. 5 shows the roof lining itself with the integrated lighting system formed by two electroluminescent strips arranged longitudinally, after having eliminated from this lining the perimeter strips in which are provided the corner holes for positioning of the support in the corresponding presses that act in certain phases of the procedure. FIG. 6 illustrates detail corresponding to the position of an electroluminescent strip integrated in the lining, the detail corresponding to the section A-A of FIG. 4;

FIGS. 8 and 9 illustrate how the electroluminescent strip or strips 8 can be located, either in an insert 14 of the actual support 3 of the lining, or on the surface thereof, that is, without inlaying.

Finally, after the phase of securing the coating 11 on the support 3, the removal is performed of the perimeter strip of the support 3 in which strip the holes 4 are made to obtain the definitive lining 13, as is represented in FIGS. 4 and 5.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The present invention may be described in terms of functional block components and various processing steps. Such functional blocks may be realized by any number of hardware components configured to perform the specified functions. The particular implementations shown and described herein are illustrative examples of the invention and are not intended to otherwise limit the scope of the invention in any way.

For the sake of brevity, conventional electronics, mechanics and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

The invention claimed is:

1. A method for creating a roof lining, comprising a lining support and a coating, with an integrated lighting system, comprising:
   positioning, in a press, different layers for the lining support;
   pressing the layers in the press, thereby producing the lining support;
   producing at least one wiring hole in the lining support for passing wiring corresponding to each of one or more electroluminescent strips;
   when automated electroluminescent strip assembly is used, producing corner holes in the lining support that correspond with each of the corners of the lining support;
   extracting the lining support produced in the press;
   positioning the lining support on a supporting cradle, with guide nipples that, when automated electroluminescent strip assembly is used, are lodged in the corner holes of the lining support;
   locating or securing the one or more of the electroluminescent strips on the lining support placed on the supporting cradle;
   extracting the lining support with the one or more electroluminescent strips from the supporting cradle;
   mounting the lining support with the one or more electroluminescent strips on another press jointly with a coating; and
   pressing an assembly formed by the lining support and the coating in the press, obtaining a roof lining with the electroluminescent strips integrated therein.

2. The method according to claim 1, further comprising, in the phase of locating or securing the one or more electroluminescent strips,
   passing a connector located on an end of a ribbon cable through the at least one wiring hole and connecting an other end of the ribbon cable to the at least one electroluminescent strip, a length of the ribbon cable and the connector being located on the rear face of the lining support.

3. A roof lining for vehicles, comprising:
   a lining support comprising a wiring hole;
   a coating that covers the lining support;
   one or more electroluminescent strips integrated in the roof lining, the one or more electroluminescent strips being located between the support of the lining and the coating, either on a surface of the support or on an insert of the support; and
   a ribbon cable comprising a connector, the connector being located on a rear face of the lining support and configured to connect to a power supply of a roof of a vehicle to which it is applied, the ribbon cable passing through the wiring hole located proximate to the connector and connecting with the one or more electroluminescent strips.

* * * * *